United States Patent
Meurer

(10) Patent No.: US 10,421,610 B2
(45) Date of Patent: Sep. 24, 2019

(54) METHOD FOR OPERATING A MODULAR SHELVING RACK WAREHOUSE AND CORRESPONDING MODULAR SHELVING RACK WAREHOUSE

(71) Applicant: Dematic GmbH, Heusenstamm (DE)

(72) Inventor: Hans Christoph Meurer, Roßdorf (DE)

(73) Assignee: Dematic GmbH, Heusenstamm (DE)

( * ) Notice: Subject to any disclaimer, the term of this patent is extended or adjusted under 35 U.S.C. 154(b) by 223 days.

(21) Appl. No.: 15/527,913

(22) PCT Filed: Nov. 16, 2015

(86) PCT No.: PCT/EP2015/076694
§ 371 (c)(1),
(2) Date: May 18, 2017

(87) PCT Pub. No.: WO2016/083179
PCT Pub. Date: Jun. 2, 2016

(65) Prior Publication Data
US 2018/0346245 A1    Dec. 6, 2018

(30) Foreign Application Priority Data

Nov. 25, 2014    (DE) .................. 10 2014 117 235

(51) Int. Cl.
*G06F 7/00*         (2006.01)
*B65G 1/137*       (2006.01)
*B65G 1/06*         (2006.01)

(52) U.S. Cl.
CPC ......... *B65G 1/1373* (2013.01); *B65G 1/1378* (2013.01); *B65G 1/06* (2013.01)

(58) Field of Classification Search
None
See application file for complete search history.

(56) References Cited

U.S. PATENT DOCUMENTS

2012/0282068 A1* 11/2012 Tschurwald ............. B65G 1/04
                                                                414/281
2016/0130086 A1*  5/2016 Yamashita ........... B65G 1/1378
                                                                414/807
2018/0319592 A1* 11/2018 Yamashita ............. G06Q 10/08

FOREIGN PATENT DOCUMENTS

AT            407384 B        2/2001
CN            1541918 A      11/2004
(Continued)

OTHER PUBLICATIONS

Preliminary Report on Patentability of the International Searching Authority in English from corresponding Patent Cooperation Treaty (PCT) Application No. PCT/EP2015/076694, English translation completed Apr. 26, 2017.
(Continued)

*Primary Examiner* — Yolanda R Cumbess
(74) *Attorney, Agent, or Firm* — Gardner, Linn, Burkhart & Ondersma LLP

(57) ABSTRACT

A method for operating a warehouse, in which a modular shelving rack warehouse having a plurality of levels and spaces is manually supplied and emptied of goods by order pickers, wherein a placing and removing of goods is possible at at least one central transfer point between the shelves of a level, and wherein the transfer points arranged at different levels are each connected to each other and to a common warehouse entrance and exit in respect of materials handling technology, and a corresponding warehouse.

20 Claims, 3 Drawing Sheets

(56) References Cited

FOREIGN PATENT DOCUMENTS

| | | |
|---|---|---|
| CN | 102482035 A | 5/2012 |
| DE | 19726593 A1 | 1/1998 |
| DE | 10105706 A1 | 9/2002 |
| DE | 202004008679 U1 | 9/2004 |
| DE | 102006023477 A1 | 11/2007 |
| DE | 602004007965 T2 | 5/2008 |
| EP | 1452462 A2 | 9/2004 |
| EP | 1857381 A2 | 11/2007 |
| EP | 1964792 A2 | 9/2008 |
| JP | 5015750 B2 | 8/2012 |
| NL | 2003022 C | 12/2010 |
| WO | 2008089980 A1 | 7/2008 |
| WO | 2010090515 A1 | 8/2010 |

OTHER PUBLICATIONS

International Search Report of the International Searching Authority from corresponding Patent Cooperation Treaty (PCT) Application No. PCT/EP2015/076694, indicated completed on Feb. 3, 2016.
Written Opinion of the International Searching Authority from corresponding Patent Cooperation Treaty (PCT) Application No. PCT/EP2015/076694, indicated completed on Jun. 2, 2016.
International Preliminary Examination Report from corresponding Patent Cooperation Treaty (PCT) Application No. PCT/EP2015/076694, dated Mar. 10, 2017.

* cited by examiner

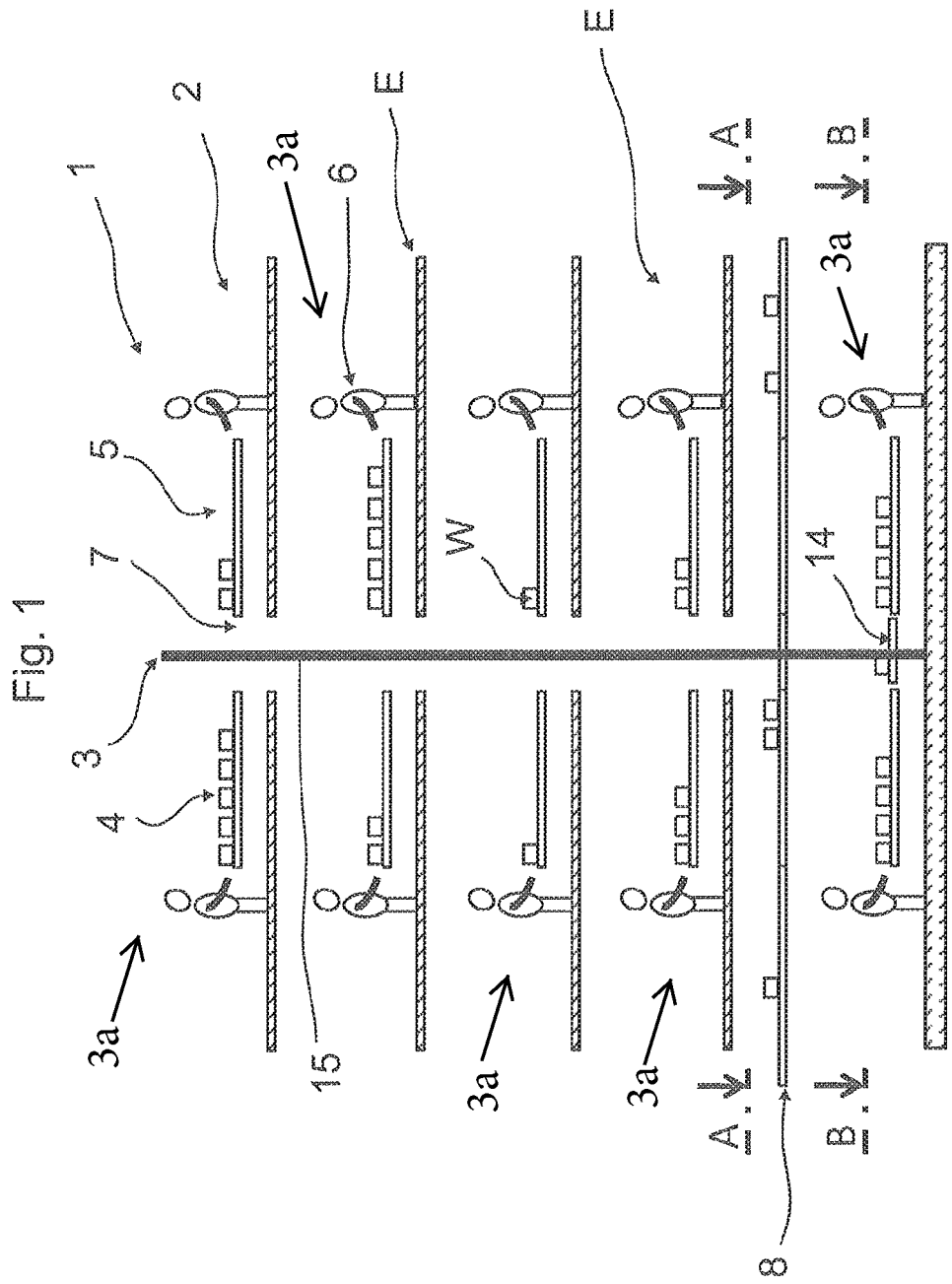

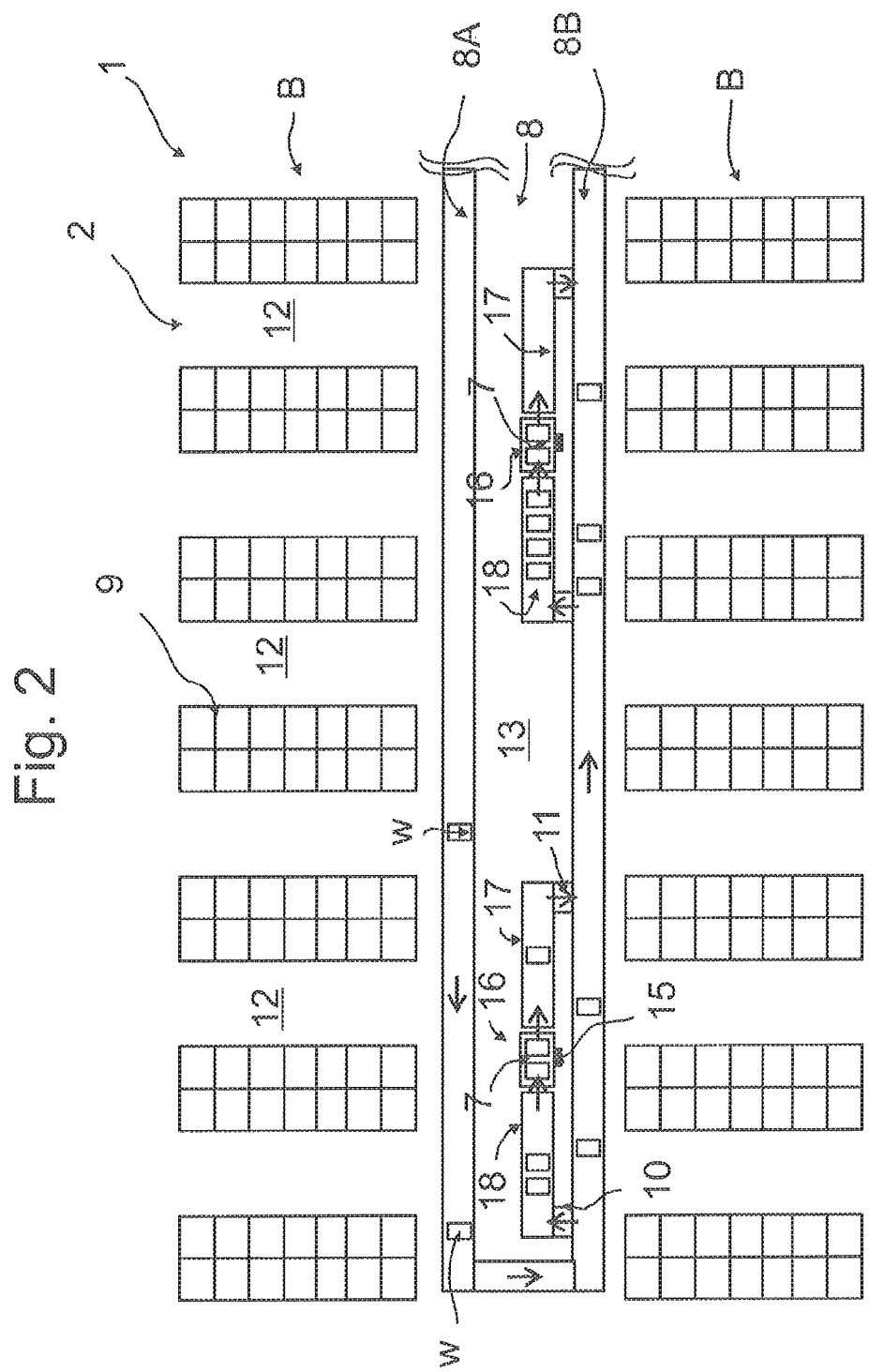

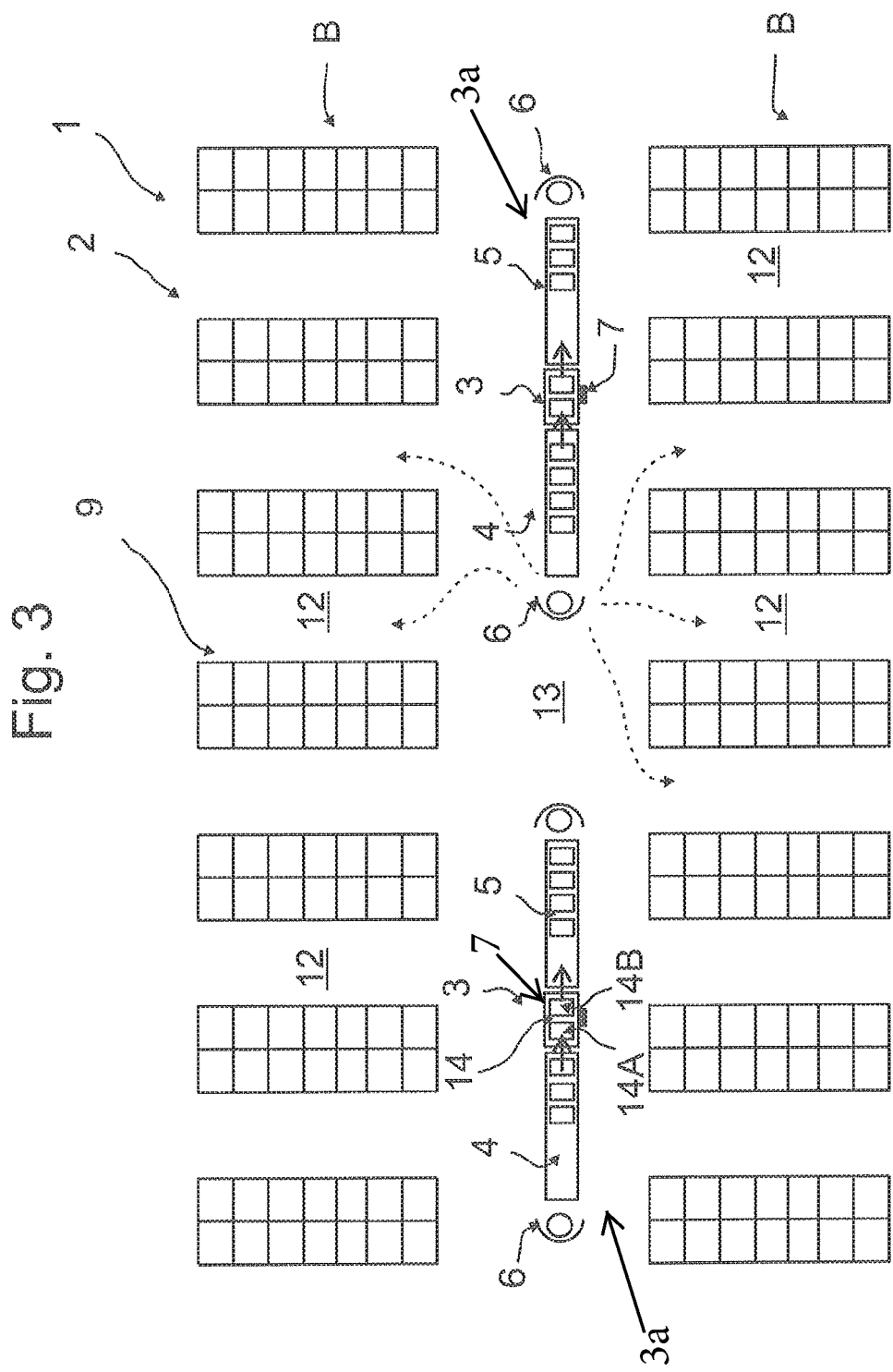

METHOD FOR OPERATING A MODULAR SHELVING RACK WAREHOUSE AND CORRESPONDING MODULAR SHELVING RACK WAREHOUSE

CROSS REFERENCE TO RELATED APPLICATION

The present application claims the priority benefits of International Patent Application No. PCT/EP2015/076694, filed on Nov. 16, 2015, and claims benefit of DE 10 2014 117 235.5, filed on Nov. 25, 2014.

BACKGROUND OF THE INVENTION

The invention relates to a method for operating a storage facility, in which order pickers manually place goods into, or remove goods from, a modular shelving racking system having a multiplicity of levels and storage locations, and the invention also relates to a corresponding modular shelving racking system.

In modular shelving racking systems, the storage units are placed on shelves, the so-called modular shelves. Therefore, articles or goods of the most varied types can be stored without the use of loading devices.

Such storage facilities are mostly operated manually, i.e. in accordance with the man-to-goods principle. Therefore, any article can be accessed with low investments costs and therefore such storage facilities are effective for picking orders.

However, a large selection of goods requires a large floor space and thus a large outlay in terms of personnel and long distances for the order pickers.

Utility model DE 20 2004 008 679 U1 discloses, for example, a storage facility which consists of a storage area, an order-picking area and a buffer device which are arranged such that the storage area is supplied with goods by shelf serving devices. In this case, however, the order pickers do not move through the storage area, but pick the goods— removed from the storage area by shelf serving devices—at fixed order-picking stations. These picking stations are arranged outside of the storage area.

SUMMARY OF THE INVENTION

The present invention provides an option with which the outlay in terms of personnel and also the distances can be reduced in large modular shelving racking systems.

In accordance with am embodiment of the invention, it has been recognised that if it is possible to place and remove goods at at least one central transfer point between the shelves of a level, wherein the transfer points arranged in different levels are each connected to one another and to a common storage entrance and exit in respect of materials handling technology, the distances for the order pickers can be shortened because they no longer have to leave the storage facility in order to deliver their collected goods or to pick up goods which are to be stored, but rather can place the goods on, or remove the goods from, the transfer points. Therefore, the requirement in terms of personnel is also reduced.

Furthermore, the invention allows several levels of the storage facility to be connected such that the space for the order pickers to move is not limited because materials handling technology, in the form of ramps or conveying sections, does not intersect and divide the storage areas. Therefore, an order picker does not have to climb over any materials handling technology or make detours around same, etc.

Depending upon the size of the storage facility—modular shelving racking systems can have more than one hundred thousand and up to one million storage locations, several transfer points per level can be arranged spaced apart from each other in a central aisle so that transfer points are provided for particular storage facility blocks and the paths remain short. The change-over times are also shortened.

A "central aisle" refers to an aisle arranged between blocks of shelving, from which in turn individual aisles run off between individual shelves.

In a particular embodiment of the invention, vertical conveyors, in particular elevators, are provided for connecting the transfer points. Owing to the vertical, or almost vertical, alignment, these require little space and provide the least hindrance to the order pickers. Elevators are preferred because they have a simple design, are cost-effective and can be loaded and unloaded simply.

The elevators can connect any number of storage facility levels. As such, they are integrated into the entire materials handling flow of the storage facility. In other words, they are not only a component of order-picking devices, in which the arrangement of containers is thus changed, but the goods themselves are integrated in the materials handling flow of the entire system via the elevators in the sense of "routing". In contrast, in DE 60 2004 007 965 T2, only individual containers are raised and lowered in an order-picking arrangement.

Preferably, the vertical conveyors which are used are those which can carry two items of goods at the same time, i.e. the lift platform thereof has two storage locations. Logically, these two storage locations can be loaded and unloaded independently of each other, e.g. by independent conveyors on the lift platform. Therefore, the elevator can place and remove goods in/from the respective level, in particular at the same time.

In accordance with an embodiment of the invention, the goods are placed into, or removed from, storage via a common storage entrance and exit, i.e. incoming and outgoing conveyors. This should not obstruct the order pickers in such a level for placing goods into and out of storage. The order picker is thus free of obstructions. This can be effected e.g. by attaching the conveyors to the ceiling.

Because the elevators are integrated in the entire materials handling flow of the system, it is not necessary for a storage entrance or exit, in terms of materials handling technology, to be arranged in each level. For example, connection can be provided only in every fourth level.

In accordance with another embodiment of the invention, the transfer points are formed as placing and removing stations, via which the vertical conveyors are connected. The placing and removing stations are thus arranged one above the other. They allow the order picker to remove the collected goods and to place goods which are to be placed into storage. The goods are not necessarily stored in containers but goods themselves may be handled.

Goods are in turn placed onto, or removed from, the vertical conveyors via at least one common incoming and outgoing conveyor (e.g. in the level for placing goods into and out of storage).

In order for the activity of the order picker and the conveyance of the vertical conveyor to be separate from each other, provision is made that the placing and removing stations each comprise a buffer conveyor at the entrance and exit to the vertical conveyor. In other words, the placing and removing stations have a (short) outgoing conveyor and a (short) incoming conveyor which are oriented linearly and have the vertical conveyor therebetween (in the respective level). These conveying passes can thus be reached easily by all order pickers and permit uninterrupted activity.

The placing and removing stations can be fitted with scanners, etc. so that after being removed an item of goods is recognised by the goods management system, management software, etc. and is further handled as required. In a similar manner, the placing and removing stations can be fitted with read-outs, displays etc. which provide the order picker with instructions on what item of goods is to go where after an article is removed from the vertical conveyor onto the buffer.

Further features and details of the invention are apparent from the following description of the drawings.

BRIEF DESCRIPTION OF THE DRAWINGS

FIG. 1 shows a schematic longitudinal sectional view through a portion of a modular shelving racking system in the region of placing and removing stations on different levels;

FIG. 2 shows a schematic plan view of the cross-section of a modular shelving racking system along line A-A in FIG. 1; and FIG. 3 shows a schematic plan view of the cross-section of a modular shelving racking system along line B-B in FIG. 1.

DESCRIPTION OF THE PREFERRED EMBODIMENTS

The figures show a distribution centre, designated as a whole with numeral 1, having a central modular shelving racking system 2 as a goods storage facility.

The modular shelving racking system 2 comprises a multiplicity of levels E, located one above another, having a multiplicity of modular shelves 9 which in turn have a multiplicity of storage locations, arranged above one another and next to one another, for goods W.

The modular shelves 9 located next to each other are separated from each other by means of standard aisles 12 and are separated into storage areas B, between which a central aisle 13 extends, from which the standard aisles 12 run off between the shelves 9.

In order to operate the modular shelving racking system 2 or the modular shelves 9, order pickers 6 are provided who place goods W into the storage facility, and remove goods therefrom, for the most part manually.

To do this, they move through the aisles 12, 13 and take goods W from the storage locations of the modular shelves 9 or place goods W therein (cf. dashed arrows in FIG. 3). To do this, the order pickers 6 are supplied with orders in a known manner, e.g. by means of portable operating devices which communicate with the storage facility control system and storage facility management system and instruct the order picker 6 via speech or displays and receive inputs in response thereto.

In order to avoid the order pickers 6 having to cover excessive distances owing to the size of the modular shelving racking system 2 (several hundred thousand storage locations), provision is made to place and remove goods W on central transfer points 3a between the shelves 9 of a level E.

To this end, placing and removing stations 3 are arranged on each of the central transfer points 3a. The intermediate space in the central aisles 13 is free in the levels E which means that the order pickers 6 do not have a limited space for movement because materials handling technology, in the form of ramps or conveying sections, does not intersect and divide the storage areas. Therefore, an order picker 6 does not have to climb over any materials handling technology or make longer detours around same, etc.

Typically, several transfer points 3a or placing and removing stations 3 per level E will be provided spaced apart from each other in the central aisle 13 in order to optimise the time taken by, and the distances travelled by, the order pickers.

In order to connect the transfer points 3a or placing and removing stations 3 of different levels located one above the other, vertical conveyors in the form of elevators 7 are provided. Owing to the vertical, or almost vertical, alignment, these require little space and provide the least hindrance to the order pickers 6. In addition, elevators 7 have a simple design, are cost-effective and can be loaded and unloaded simply.

In order for the activity of the order picker 6 and also the conveyance of the elevator 7 to be separate from each other, the placing and removing stations 3 each comprise a buffer conveyor 4, 5 at the entrance and exit to the elevator 7.

The placing and removing stations have a short outgoing conveyor 5 and a short incoming conveyor 4 which are oriented linearly and have the elevator 7 therebetween (in the respective level). These conveying passes 4, 5 can thus be reached easily by all order pickers 6 and permit uninterrupted activity.

The elevators 7 can carry two items of goods W at the same time, i.e. the lift platform 14 thereof comprises two storage locations 14A, B. In addition, these two storage locations 14A, B can be loaded and unloaded independently of each other by independent conveyors. Therefore, the elevator 7 can place and remove goods W in/from the respective level W at the same time.

In addition to the lift platform 14, the elevators 7 have a lateral support mast 15 on which the lift platform 14 is moved.

In accordance with the invention, the goods are placed into, or removed from, storage 2 via a common storage entrance and exit, i.e. an incoming and outgoing conveyor 8. This is likewise arranged so as to be free of obstructions by attaching them to the ceiling of the corresponding level E.

The incoming and outgoing conveyor 8 is thus connected in this level E to the elevators 7 so that the elevators can exchange goods therewith. It is understood that not every level has to be provided with an incoming and outgoing conveyor 8.

For this purpose, the incoming and outgoing conveyor 8 is formed as a loop, wherein one end 8A is the entrance end and the other end 8B is the exit end, said ends each connecting the modular shelving racking system 2 with the rest of the distribution centre 1.

The incoming and outgoing conveyor 8 is connected to the elevators 7 via placing and removing stations 16. In a similar manner to the placing and removing stations 3, the placing and removing stations 16 likewise have a short outgoing conveyor 17 and a short incoming conveyor 18 which are oriented linearly and have the elevator 7 therebetween.

In addition, the outgoing conveyors 17 and incoming conveyors 18 are each connected to the incoming and outgoing conveyor 8 via transverse conveyors 10, 11 (cf. FIG. 2).

The placing and removing stations 3 are fitted with scanners, etc. so that after being removed an item of goods is recognised by the goods management system, management software, etc. and is further handled as required. In a similar manner, the placing and removing stations 16 are fitted with read-outs, displays etc. which provide the order picker 6 with instructions on what item of goods W is to go where after an article is removed from the vertical conveyor onto the buffer.

The invention claimed is:

1. A method for operating a storage facility, wherein order pickers manually place goods into, or remove goods from a modular shelving racking system, the method comprising:
   providing a modular shelving racking system having a multiplicity of levels and storage locations for placing and removing goods at at least one central transfer point of multiple transfer points between shelves on each level of the modular racking system, wherein each level comprises multiple transfer points;
   wherein each level includes a central aisle and the multiple transfer points of each level are arranged spaced apart from each other in the respective central aisle of each level, wherein the multiple transfer points on each level comprise placing and removing stations arranged in the respective central aisle with the placing and removing stations between each level being connected to one another and to a common storage entrance and exit by vertical conveyors;
   the central aisle of each level is arranged between shelves of each respective level and is connected with individual aisles arranged between individual shelves on a same side of the central aisle; and
   wherein the placing and removing stations on each level have buffer conveyors for moving goods to and from the common storage entrance via respective ones of the vertical conveyors;
   the method further comprising:
   order pickers manually placing goods into, or removing goods from the modular shelving racking system, wherein the order pickers move through the individual aisles and central aisles and take goods from the storage locations of the modular shelves or place goods therein.

2. The method as claimed in claim 1, wherein the vertical conveyors are used to connect the transfer points between the levels.

3. The method as claimed in claim 2, wherein the vertical conveyors are configured to carry two items of goods at the same time.

4. The method as claimed in claim 3, wherein the two items of goods can be loaded and unloaded independently of each other.

5. The method as claimed in claim 1, wherein each respective transfer point is configured such that goods can be simultaneously placed into and removed therefrom.

6. The method as claimed in claim 1, wherein the common storage entrance and exit is arranged so as not to block movement of the order pickers.

7. A manual modular shelving racking system, said system comprising:
   a multiplicity of levels and storage locations into which goods are placed, or from which goods are removed manually by order pickers;
   each different level including shelves, a central aisle and at least one placing and removing station arranged in the respective central aisle of the level between the shelves on opposite sides of the central aisle of the level;
   at least one vertical conveyor connected both (i) to a placing and removing station of each different level and (ii) to a common incoming and outgoing conveyor, wherein the incoming and outgoing conveyor conveys goods for the entire modular shelving racking system;
   wherein each of the placing and removing stations further comprise a buffer conveyor for receiving goods from the incoming and outgoing conveyor via the respective vertical conveyor and comprise a buffer conveyor for delivering goods to the incoming and outgoing conveyor via the respective vertical conveyor.

8. The modular shelving racking system as claimed in claim 7, wherein several placing and removing stations per level are arranged spaced apart from each other in the central aisle of the level.

9. The modular shelving racking system as claimed in claim 7, wherein placing and removing stations located on different levels are located one above another and are connected by vertical conveyors comprising elevators having lift platforms.

10. The modular shelving racking system as claimed in claim 9, wherein the lift platforms comprise two storage locations.

11. The modular shelving racking system as claimed in claim 10, wherein each of the lift platforms have independent conveyors for each of the two storage locations which can move independently of each other.

12. The modular shelving racking system as claimed in claim 11, wherein the incoming and outgoing conveyor is arranged on a ceiling of a level.

13. The modular shelving racking system as claimed in claim 7, wherein the incoming and outgoing conveyor is arranged on a ceiling of a level.

14. The modular shelving racking system as claimed in claim 9, wherein the at least one vertical conveyor comprises an elevator.

15. A modular shelving racking system for a storage facility, wherein order pickers manually place goods into, or remove goods therefrom, said system comprising:
   a multiplicity of levels and storage locations, wherein each level comprises shelves, a central aisle and a plurality of central transfer points spaced apart from each other in the central aisle of the level with the central aisle being arranged between blocks of shelving, and wherein individual aisles run off from the central aisle on each level between individual shelves on the same side of the central aisle;
   wherein the central transfer points comprise placing and removing stations, and wherein goods are placed and removed from at at least one central transfer point of the plurality of central transfer points between the shelves of a level;
   wherein central transfer points arranged in different levels are connected to one another and to a common storage entrance and exit by vertical conveyors; and
   wherein the placing and removing stations each have at least one buffer conveyor onto which goods are received from the common storage entrance and exit via a respective one of the vertical conveyors and/or wherein goods are placed for delivery to the common storage entrance and exit via the respective one of the vertical conveyors;
   wherein the aisles enable order pickers to manually place goods into, or remove goods from, the modular shelving racking system, such that the order pickers move through the central and individual aisles and take goods from the storage locations of the modular shelves or place goods therein.

16. The system as claimed in claim 15, wherein each transfer point on a given level is connected to a separate vertical conveyors.

17. The system as claimed in claim 16, wherein the vertical conveyors comprise elevators.

18. The system as claimed in claim 16, wherein the vertical conveyors are operable to simultaneously carry two items of goods.

19. The system as claimed in claim 18, wherein the two items of goods can be loaded and unloaded independently of each other.

20. The system as claimed in claim 15, wherein goods can be placed into, and removed from, the transfer points at the same time.

* * * * *